Patented Apr. 26, 1927.

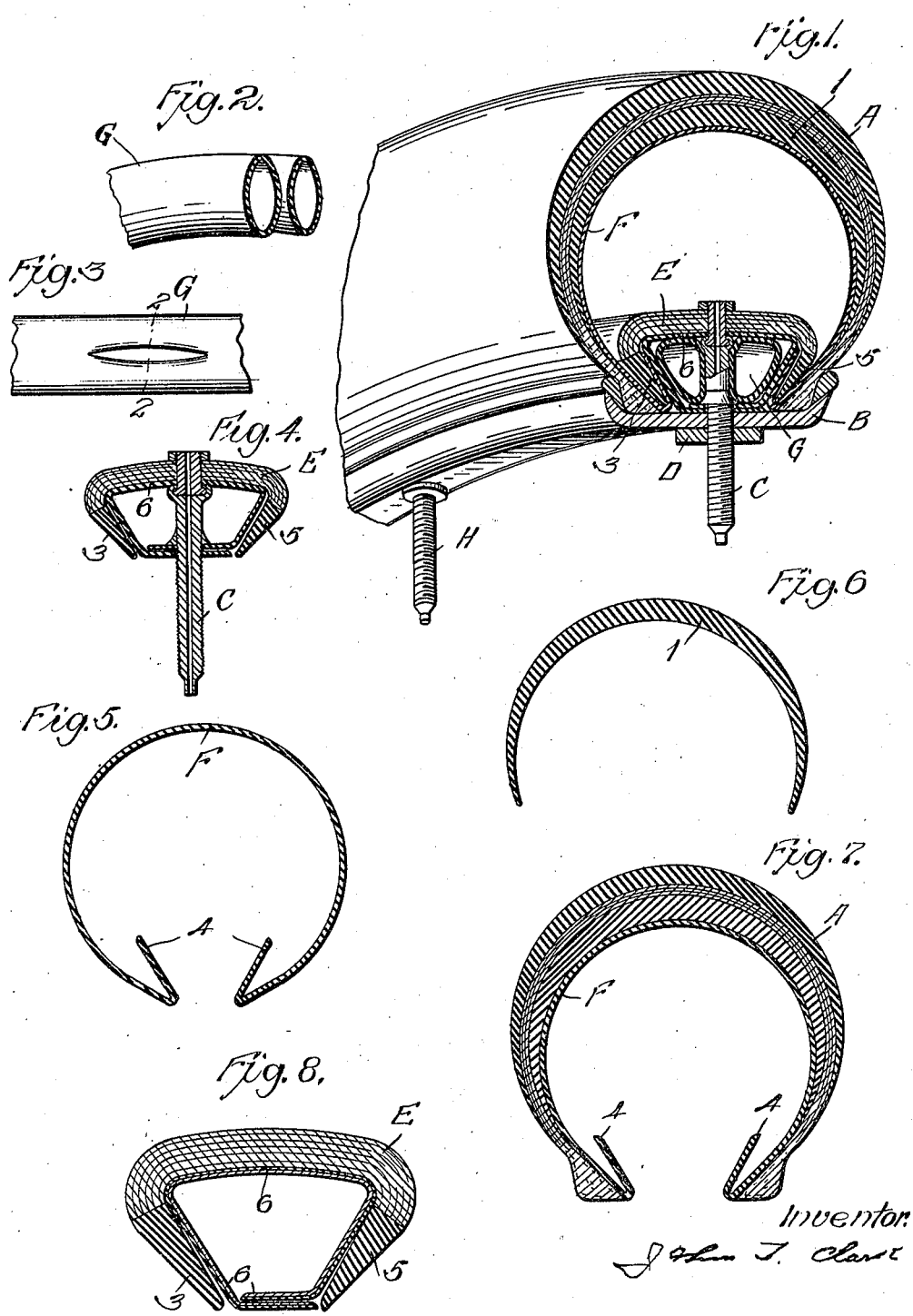

1,626,511

UNITED STATES PATENT OFFICE.

JOHN T. CLARK, OF PROVO, UTAH.

VEHICLE TIRE.

Application filed March 8, 1926. Serial No. 93,112.

My invention relates to vehicle tires and has for its object to provide a pneumatic vehicle tire for use on road vehicles in which an inner fabric casing and an inner fabric liner has a tube therein by which said casing is inflated with compressed air to hold an inflated outer or tread casing on the tire rim.

These objects I accomplish with the device illustrated in the accompanying drawings in which similar letters and numerals of reference indicate like parts throughout the several views and as described in the specification forming a part of this application and pointed out in the appended claims.

In the drawings in which I have shown the preferred embodiment of my invention, Figure 1 is a view in perspective cross section of the tire. Figure 2 is a perspective cross section on line 2—2 of Figure 3. Figure 3 is a plan view of a portion of the inner tube showing the opening through which the air valve passes. Figure 4 is a cross section of the air valve and the inner casing. Figure 5 is a cross section of the inner liner. Figure 6 is a cross section of the soft rubber filler. Figure 7 is a cross section of the outer casing, with the inner liner and filler in place between them. Figure 8 is a cross section of the inner casing.

In the said drawings the present invention is shown with the tread casing as A and the tire rim as B. The valve stem is shown as C and the nut to hold the same in place within the tire rim is shown as D. I use an ordinary outer casing as my tread casing A, which is adapted for use on the tire rim B of the vehicle wheel. On the inner wall of said tread casing A I provide a long napped filler member 1, conforming to the shape of the interior of said tread casing except that its edges do not come together. On the inner walls of the casing A and of filler member 1 I provide inner lining F with its edges turned back, as shown at 4. To secure and seal the said tread casing A to the tire rim B I provide an inner casing E, having three walls and formed into an annular form which is practically triangular in cross section when fully inflated, with the edges constructed of fabric and rubber and positioned contiguous the edges of the inner lining portion F of the tread casing A, with the said sides 3 and 5 in contact with the portions 4 of said inner lining portion F of the tread casing. Within said inner casing E is the inner liner portion 6, which is made of thin, flexible material. The said liner 6 is made of a flexible fabric cover on its outer face with soft rubber, and with its edges adapted to overlap contiguous the said rim B. The side walls of said liner portion 6 bear against the portions 4, 4 of the liner portion F when the tire is inflated. The portions 3 and 5 of the edges of said inner casing are also made of soft rubber to secure a better sealing of my tire when it is inflated. An air tube G is provided for inflating the said inner casing, which tube is for most of its length similar to a bicycle tube, and for the remaining portion is divided into two tubes, as shown in Figures 2 and 3. The hole formed between the two tubes is to let the air valve stem C for the outer casing A pass therethrough.

The assembling of my device is as follows:—Within the convention outer casing I first place a long napped filler casing of gummy uncured rubber and to hold this to the inner face of the casing A I provide an inner liner F made of cured rubber, similar to the rubber in an inner tube. I then place the inner casing E within the outer casing and with the tapered edges 3 and 5 and the inner liner 6 in close contact with the ends 4 of the liner F. The small inner tube G is placed within the inner casing E and inflated by air introduced through the air tube H, which is of the conventional type and is secured to and opens into said tube G. The pressure of the air within the inner tube G on the inner liner 6 will force the overlapping portions of the said liner 6 against the rim of the tire and against the ends 4 of the liner F, the portions 3 and 5 of the inner casing F, and against the contiguous inner face of the liner F, making an air tight joint between the respective contiguous parts of the inner casing and the outer casing where the rubber portions of said casings come into contact. Air may then be forced into the outer casing A to the desired amount without any leakage therefrom and the face of the outer casing may be punctured by nails or other sharp articles and the gum in the filler 1 will fill the puncture as soon as the object is withdrawn, making a puncture-proof tire and one which will not stone-bruise or rim-cut. Any desired amount of air can be placed within the respective casings A and E.

Having thus described my invention I desire to secure by Letters Patent and claim:—

1. A vehicle tire comprising an outer casing having a soft rubber filler and an inner liner cemented to form a casing; flanged edges on said inner liner; an inner casing concentric with said outer casing and carried therein; edges on said inner casing adapted to fill the space between the flanged edges of said inner liner and the main body of said liner; a soft rubber liner, a portion of which is cemented to the inner wall of said inner casing, and having overlapping edges thereon; an inner tube within said inner casing; and means to inflate both of said casings.

2. A vehicle tire comprising an outer casing made by a filler member and a lining member cemented to each other and to the inner wall of said outer casing; an inner casing triangular in cross section concentrically carried in said outer casing; said inner casing consisting of a casing having soft rubber edges; a liner therein with overlapping edges; an inner tube carried in said last mentioned casing and having a divided portion to form a sealed slot transversely through said tube; and an air valve passed through said slot and through the overlapped edges of said liner and through said inner casing; and means to inflate said inner tube.

3. A vehicle tire comprising an outer casing which consists of a tread casing with a filler member and a lining member cemented together; an inner casing carried within said outer casing, and which inner casing consists of a fabric casing having rubber edges; a liner within said inner casing; an inner tube carried within the last mentioned casing and having a sealed transverse slot through said tube; and an air valve stem passed through said slot, and inner casing to inflate said outer casing.

In testimony whereof I have affixed my signature.

JOHN T. CLARK.